United States Patent [19]

McElreath

[11] Patent Number: 4,467,643
[45] Date of Patent: Aug. 28, 1984

[54] AIRCRAFT INDICATOR CAPABLE OF OPERATION IN HSI MODE OR CDI MODE

[75] Inventor: Kenneth W. McElreath, Cedar Rapids, Iowa

[73] Assignee: Rockwell International Corporation, El Segundo, Calif.

[21] Appl. No.: 393,167

[22] Filed: Jun. 28, 1982

[51] Int. Cl.³ .................... G01C 21/00; G09F 9/00
[52] U.S. Cl. ........................... 73/178 R; 116/290; 116/DIG. 43
[58] Field of Search ............ 116/290, DIG. 43; 33/349, 356, 317 D; 73/178 R; 340/27 NA

[56] References Cited

U.S. PATENT DOCUMENTS 3,538,881 11/1970 Fenwick .......................... 116/290
3,696,671 10/1972 Steigleder et al. ............... 73/178 R

FOREIGN PATENT DOCUMENTS 2709212 9/1978 Fed. Rep. of Germany ........ 33/356

Primary Examiner—Donald O. Woodiel
Attorney, Agent, or Firm—Terry M. Blackwood; George A. Montanve; H. Fredrick Hamann

[57] ABSTRACT

An indicator instrument for aircraft may be operated in either of two modes. In an HSI mode, first indicia reflect heading, second indicia reflect selected course, and third indicia reflect course deviation. In a CDI mode, the first indicia reflect selected course, the second indicia assume a fixed position, and the third indicia reflect course deviation. A compass validity signal automatically triggers the changeover from HSI mode to CDI mode.

5 Claims, 4 Drawing Figures

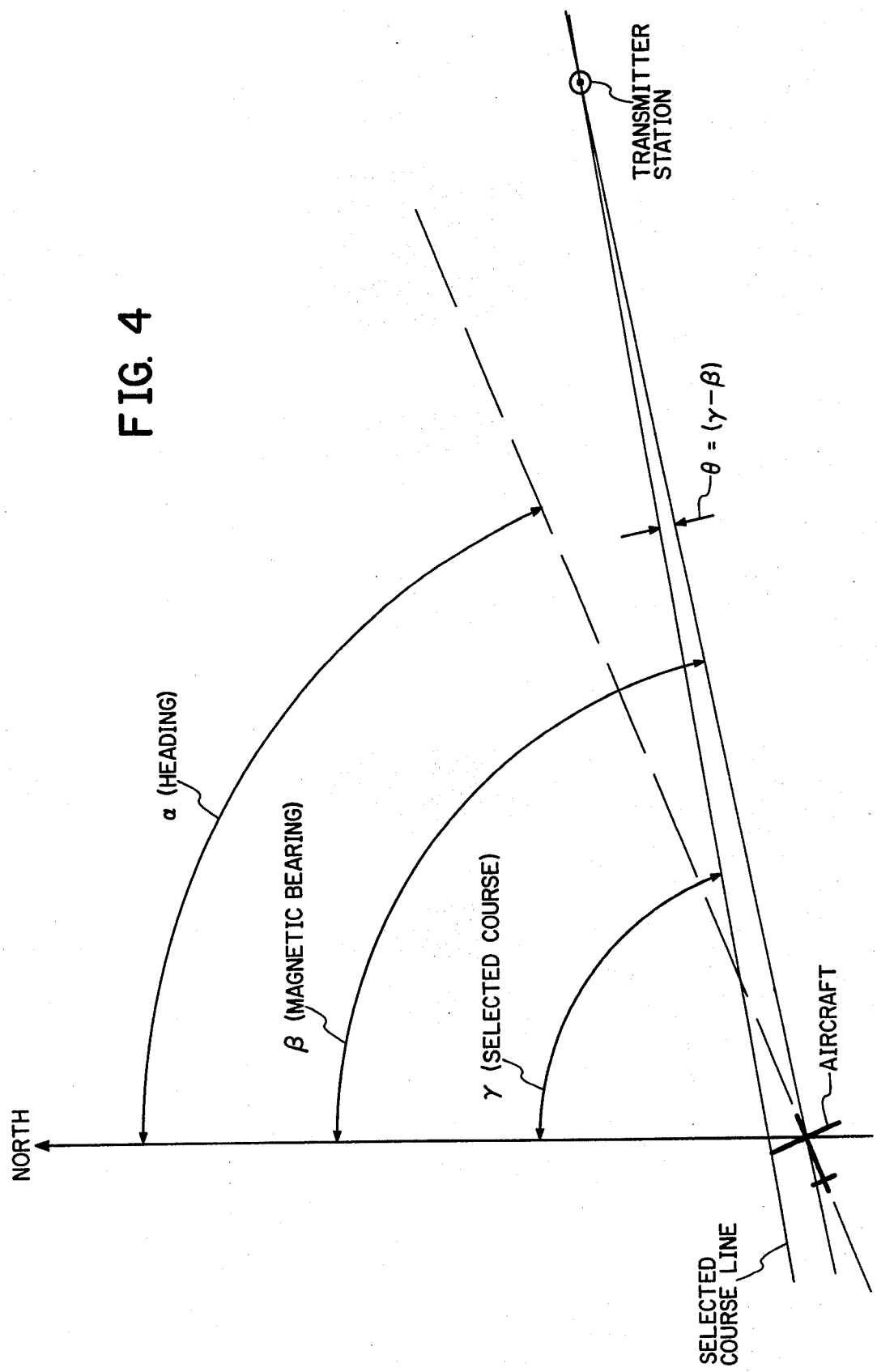

AIRCRAFT INDICATOR CAPABLE OF OPERATION IN HSI MODE OR CDI MODE

This invention relates generally to aircraft indicators and more particularly to an aircraft indicator relating to both horizontal situation displays and course deviation displays.

Horizontal situation indicators are widely employed in modern-day aircraft and present to the pilot a picture-like view, as the name implies, of the horizontal situation; that is, the geographical orientation of the aircraft with respect to a compass card and with respect to a selected course; and including an indication of deviation of the aircraft with respect to a selected course. A pictorial representation of the orientation of an aircraft with respect to a map-like display is presented much the same as the pilot would "see" should he be located over the aircraft and be viewing his aircraft with respect to a ground map More particularly, conventional horizontal situation indicators (HSI's) typically indicate (i) the angle of aircraft heading relative to north (ii) the angle of selected course line relative to north, (iii) the course deviation from the selected course line and (iv) whether the selected course, with respect to the aircraft's present position, represents a course to the selected station (such as a VOR station) of a course from the station.

Conventional course deviation indicators (CDI's) are typically somewhat less complicated indicators and, while indicating selected course, deviation from selected course, and "to" or "from", do not provide the aircraft heading information or indication. (It should be noted that in the present-day terminology and vernacular of the art, there are inconsistencies in definitions and thus quite often a horizontal situation indicator will be called a course deviation indicator. This is probably because the HSI, although providing more, does provide the same information as a CDI. Thus for purposes of definition herein, the terms HSI and CDI will be used in line with the above distinctions to refer to somewhat related yet different indicators.)

The conventional HSI and the conventional CDI each has its limitations. For example, the conventional HSI, although providing more information than a conventional CDI, is dependent on an aircraft compass and thus the HSI display becomes unreliable when the compass output becomes invalid; that is, the HSI cannot, when the compass is invalid, reliably provide either heading of course information. On the other hand, a conventional CDI, although not dependent on a compass, does not provide the desired heading information provided by a conventional HSI.

In accordance with the present invention, an indicator is convertible between conventional HSI and CDI modes and, in the preferred embodiment, normally operates in an HSI mode and reverts to a CDI mode when the compass output signal becomes invalid. These and other features, aspects, and advantages will become more apparent upon reference to the following specification, claims, and appended drawings in which:

FIG. 4 is a representational vire from above an aircraft and shows a flight situation corresponding to the FIG. 2 indicator readings.

Figure 1:
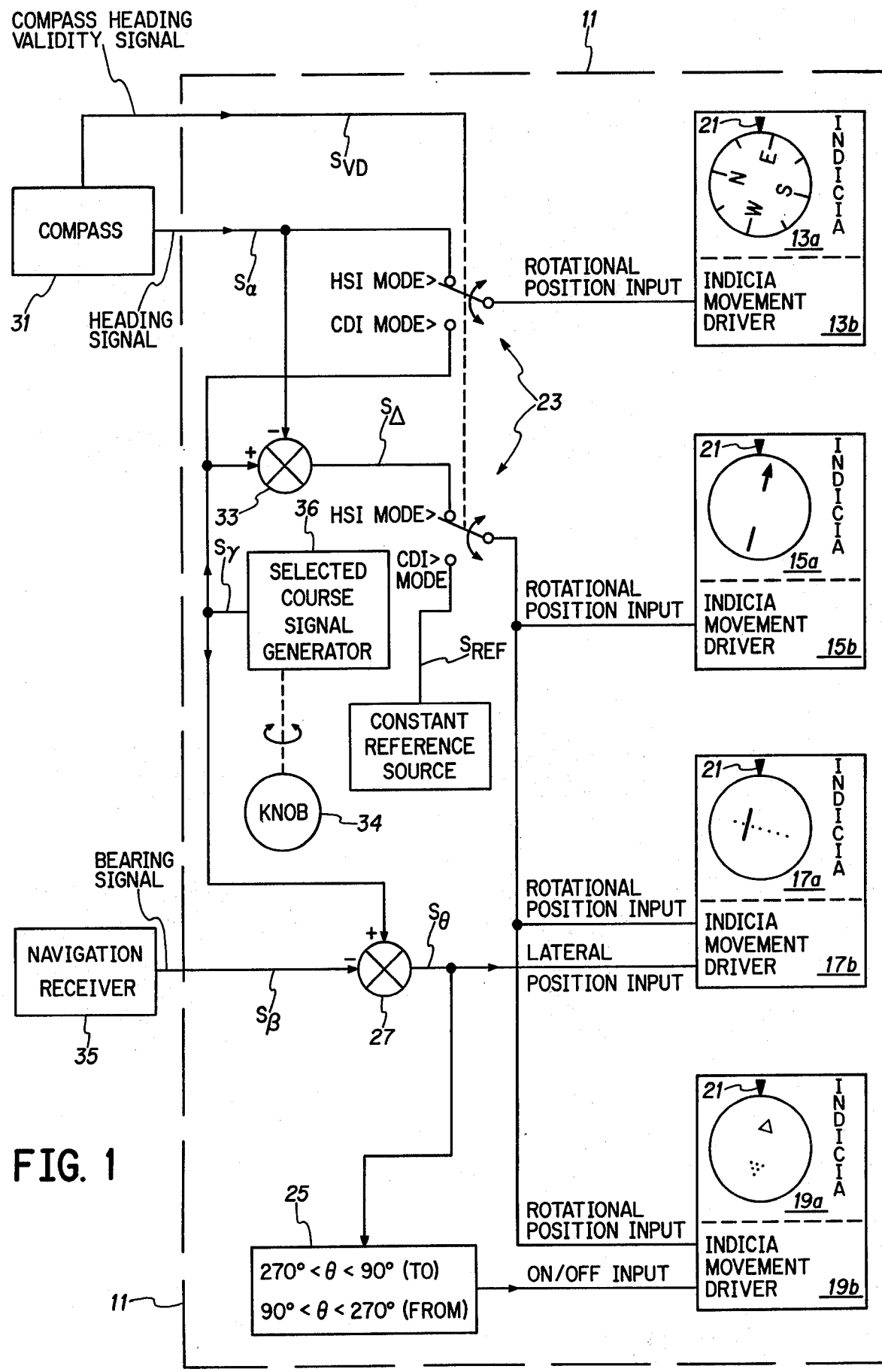
FIG. 1 is a block diagram functional schematic representing the convertible indicator and systems supplying data or signals thereto.
Figure 3:
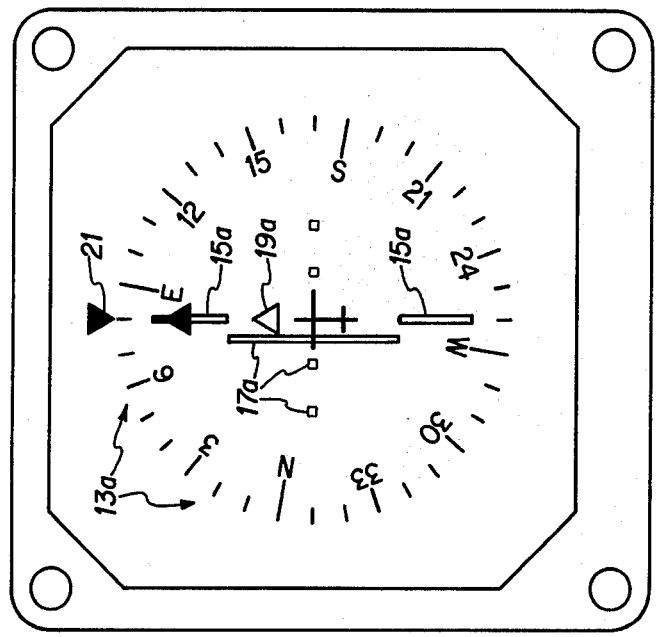
FIG. 3 is a front view representing the FIG. 2 indicator face after the FIG. 1 apparatus has reverted to the CDI mode.
Figure 2:
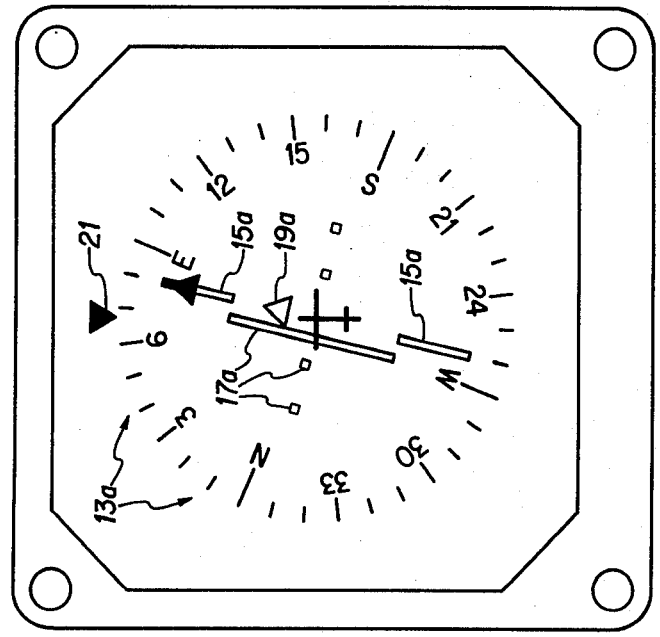
FIG. 2 is a front view representing a indicator instrument face including individual indicator elements of the FIG. 1 apparatus and their format and arrangement in the HSI mode.

Reference will now be made simultaneously to FIGS. 1, 2, and 3. FIG. 1 is useful in explaining operation while FIGS. 2 and 3 not only represent the display appearance for two different modes of operation but also more realistically represent the indicia and face of indicator instrument 11 in FIG. 1 in that the various indicia are actually perceived as superposed and/or integrated on a single display format. More particularly, regardless which mode is in effect, an observer of the face of indicator 11 preceives indicia 13a, indicia 15a, indicia 17a, and indicia 19a. As illustrated, the form of indicia 13a is preferably a compass card, the form of indicia 15a is preferably two segments of an arrow, the form of indicia 17a is preferably a third segment of the same arrow plus a scale comprising dots oriented along a line perpendicular to the third segment, and the form of indicia 19a is preferably a pair of non-simultaneously appearing, opposingly directed arrowheads. A lubber line indicia 21 denotes a top center reference position. Indicia 13a, 15a, 17a, and 19a are caused to move in a particular manner to newly commanded positions by, respectively, drivers 13b, 15b, 17b, and 19b responsive to signals received at the driver inputs. Drivers 13b and 15b cause indicia 13a and 15a, respectively, to rotate to newly commanded positions. Driver 17b causes indicia 17a to rotate to a newly commanded position and, further, causes the arrow segment of 17a to move laterally to a newly commanded position. Driver 19b causes indicia 19a to rotate to a newly commanded position and, further, causes one or the other of two complementary or opposingly directed arrowheads to come into view. One of the two arrowheads is illustrated as being in view and, in FIG. 1, a dotted outline represents the location of the complementary arrowhead were it the one perceived.

Irrespective of which mode is in effect, indicia 15a, 17a, and 19a are all caused to rotate in unison to a newly commanded common angular position due to appropriate connection enabling their being driven rotationally by the same signal. Also irrespective of mode, the on/off input to driver 19b comprises the output signal of a to-from decision circuit 25 about which more will be said hereinbelow. Also irrespective of mode, the lateral position input to driver 17b comprises the output signal of differential 27. The particular signals connected to the rotational position inputs of drivers 13b, 15b, and 17b depend on which of the two modes of operation is selected by switch 23.

In the mode of operation as represented by FIGS. 1 and 2, namely, the HSI mode, (i) the rotational position input of driver 13b receives a heading indicative signal $S_\alpha$ from a remotely located compass 31, and (ii) the rotational position input of driver 15b receives a signal $S_\Delta$ which is indicative of the difference, as effected by differential 33, between $S_{60}$ and a signal $S_\gamma$ indicative of the pilot's selected course. The rotational positions are with respect to fixed lubber line indicia 21. Selected course is set by the pilot via course selector knob 34 and signal generator 36. As mentioned above, due to being driven by a common signal, indicia 17a and 19a stay in the same rotational position as indicia 15a. Furthermore, the lateral position input of driver 17b receives a signal $S_\theta$ indicative of the difference, as effected by differential 27, between $S_\gamma$ and a bearing indicative signal $S_\beta$ from a remotely located navigation receiver 35. The on/off of driver 19b receives a logic or binary signal $S_L$ which is indicative of the sign of the cosine of the angle represented by $S_\theta$. Briefly correlating FIG. 1 with FIG. 4, FIG. 1 signals $S_\alpha$, $S_\gamma$, and $S_\beta$ and $S_\theta$ are indicative respectively of the FIG. 4 angles $\alpha$, $\gamma$, $\beta$, and $\theta$. FIG. 1 signal $S_L$ and the commanded arrowhead of 19a correspond to the flying toward or "to" condition of FIG. 4. FIG. 1 signal $S_\Delta$ is indicative of the difference between the FIG. 4 angles $\alpha$ and $\gamma$.

During HSI mode operation, indicia 13a reflect the aircraft heading, indicia 15a reflect the selected course, indicia 17a reflect the deviation from the selected course, and indicia 19a reflect whether the aircraft is flying to or from the transmitter. More particularly, the compass card of 13a is caused to rotate to a position such that the heading of the aircraft appears directly under the lubber line 21. The arrow segments of 15a are caused to rotate to a position such that the arrow points to the value on 13a which represents the selected course, i.e., the angle of the selected course relative to north. (Since it is desired to have the arrow 15a point to a particular location on the card of 13a, the arrow segments of 15a should track any rotation change in 13a; thus, difference signal $S_\Delta$ is used as input to driver 15b so as to provide the two simultaneous effects of independent positioning and position tracking.) The arrow segment of 17a is caused to move laterally along the scale to a position which represents the angular amount of direction of deviation from the selected course. The "to" arrowhead of 19a is caused to appear thereby representing flight toward the transmitter, and the "from" arrowheads is caused to be blocked or extinguished.

Referring now simultaneously to FIGS. 2 and 4, FIG. 2 represents the indicator face operating in the HSI mode and reflecting the flight situation represented in FIG. 4. FIG. 4 shows an aircraft heading ($\alpha$) of about 67° and accordingly the card of 13a reads 67° under the lubber line. FIG. 4 shows a selected course ($\gamma$) of about 80° and accordingly the arrow of 15a points to the value of 80° on 13a. FIG. 4 shows a bearing ($\beta$) of about 78°, which means the aircraft is about 2° from the selected course of 80°, and accordingly, the segment of 17a is displaced about 2° from center. Moreover, FIG. 4 shows the desired course line is to the pilot's left and accordingly the segment of 17a is displaced to the left of center. FIG. 4 shows that the aircraft is flying to the transmitter and accordingly the "to" arrowhead appears and the "from" arrowhead does not.

Referring now simultaneously to FIGS. 1 and 3, the CDI mode is effected by switch 23 responding to signal $S_{VD}$ and causing the inputs of drivers 13b and 15b to receive different signals than what was received during the HSI mode of operation. The switchover from HSI mode to CDI mode occurs in response to a heading validity signal $S_{VD}$ and more particularly occurs when $S_{VD}$ indicates that the heading signal $S_\alpha$ is invalid. In the CDI mode, the input of driver 13b receives signal $S_\gamma$, and the input of driver 15b receives a constant reference signal $S_{ref}$. Indicia 15a, 17a, 19a, as in the HSI mode, are still required to have the same rotational position, but in the CDI mode, this position is stationary and does not change with any variable. This stationary position is dictated by the value of $S_{ref}$ and in the preferred embodiment, as reflected by FIG. 3, is one in which the arrow segments of 15a and 17a are vertically oriented, the scale of 17a is horizontally oriented, and the arrowheads of 19a point vertically. The other inputs, to driver 17b and 19b, receive the same signals in the CDI mode as in the HSI mode.

FIG. 3 represents the indicator face operating in the CDI mode and for the same flight situation applicable to FIG. 2, namely, the flight situation represented by FIG. 4. As seen from FIG. 3, in the CDI mode, indicia 13a reflect the selected course, indicia 15a, 17a, and 19a are rotationally locked in vertical alignment with the lubber line, indicia 17a (as in the HSI mode) reflect the deviation from the selected course, and indicia 19a (as in the HSI mode) reflect whether the aircraft is flying to or from the transmitter. In the flight situation depicted in FIG. 4, the selected course is about 80° and accordingly, as seen in FIG. 3, the card of 13a reads 80° under the lubber line. Additionally, FIG. 4 shows a bearing of about 78° which means the aircraft is about 2° from the selected course, and accordingly the segment of 17a is displaced about 2° from center. Moreover, FIG. 4 shows the desired course line is to the pilot's left and accordingly the segment of 17a is displaced to the left of center. Also, FIG. 4 shows that the aircraft is flying to the transmitter and accordingly the "to" arrowhead appears, and the "from" arrowhead does not appear.

Referring now to FIG. 1, it will be appreciated by those skilled in the art that items represented thereby may be variously implemented. For example, in mechanical instruments, the various indicia may be implemented via markings or lines on rotating and/or translating plates, discs, tapes, shutters, pointer arms, or the like; moreover, the drivers may comprise servomotor drives. See for example U.S. Pat. No. 3,538,881.

In electronic instruments, the indicia may be electronically written on the face of a cathode ray tube (CRT). Additionally, the drivers may comprise separate and dedicated RAM portions each inputting appropriate indicia-position-movement data or signal to a common computer which causes the indicia to be written on the CRT and also to move to commanded positions. See, for example, U.S. Pat. No. 3,775,760.

Additionally, in mechanical embodiments, the signal to the rotation position inputs of drivers 17b and 19b may be coupled mechanically, instead of electrically, from 15b. Also, differentials 27 and 33 may be implemented mechanically or electronically.

Further exemplary, signals such as $S_\alpha$, $S_\beta$, and $S_\gamma$ may comprise three-wire information such as that supplied by synchros. Also, decision circuit 25 may be either an analog or digital implementation.

Thus while particular embodiments of the present invention have been shown and/or described, it is apparent that changes and modifications may be made therein without departing from the invention in its broader aspects. The aim of the appended claims, therefore, is to cover all such changes and modifications as fall within the true spirit and scope of the invention.

What is claimed is:

1. A horizontal situation indicator (HSI) comprising a display having capability of simultaneously displaying (a) heading, (b) course, and (c) course deviation, and
    mode conversion means for enabling said HSI display to operate two different modes, one of said modes being a mode wherein (a), (b), and (c) are displayed, and the other said two modes being a mode wherein (b) and (c), but not (a), are displayed.

2. An aircraft horizontal situation indicator (HSI) comprising a display having capability of simultaneously displaying (a) heading, (b) course, and (c) course deviation, and having input means for receiving heading signal and validity signal from a compass and for receiving bearing signal from a navigation receiver, and mode conversion means for (i) enabling said HSI display to operate in first and second modes, and (ii) in response to the validity signal, automatically causing the HSI display mode of operation to change from the first mode to the second mode when the compass validity signal indicates that the heading signal is invalid, said first mode being a mode wherein (a), (b), and (c) are simultaneously displayed, and said second mode being a mode wherein, of (a), (b), and (c), only (b) and (c) are displayed.

3. For use in an aircraft having a compass for providing a heading signal and a navigation receiver for providing a bearing signal, indicator apparatus comprising:

input means for receiving said heading and bearing signals;

means for setting in to the apparatus a selected course which it is desired to follow;

means for providing a display to an observer such that the observer perceives at least first, second, and third indicia;

said display providing means, in a first mode of operation, being responsive to said heading and bearing signals and to the selected course setting means such that (i) the first indicia reflects a first variable, namely, aircraft heading, (ii) the second indicia reflects a second variable, namely, the particular course selected, and (iii) the third indicia reflects a third variable, namely, deviation of the aircraft from the selected course;

said display providing means, in a second mode of operation, being responsive to said bearing signal and to the selected course setting means such that (iv) the first indicia reflects said second variable, (v) the second indicia reflects a constant reference, and (vi) the third indicia still reflects said third variable; and control means for causing said display providing means to operate in a commanded one of said first or second modes.

4. Apparatus as defined in claim 3 wherein said display providing means (a) provides a display so that the observer perceives a fourth indicia, and (b) in either mode, said fourth indicia reflects a fourth variable, namely, whether the aircraft is flying to or from a particular transmitter, with respect to the selected course.

5. Apparatus as defined in claim 3 and 4 wherein a compass validity signal is available, and said control means, in response to the validity signal indicating that the heading signal is invalid, automatically causes said display providing means to change from operating in the first mode to operating in the second mode.

* * * * *